United States Patent [19]

Deller

[11] 4,266,381
[45] May 12, 1981

[54] EXTRUDED NONSKID TREADWAY

[75] Inventor: Robert J. Deller, Buffalo Grove, Ill.

[73] Assignee: Pullman Incorporated, Chicago, Ill.

[21] Appl. No.: 99,682

[22] Filed: Dec. 3, 1979

[51] Int. Cl.³ .................... B44D 5/08; B32B 3/30
[52] U.S. Cl. ........................... 52/177; 52/578;
52/595; 72/253 R; 72/256; 428/53; 428/141;
428/156; 428/167; 428/179
[58] Field of Search ............ 428/141, 167, 174, 53,
428/119, 156, 179; 52/177, 179, 660, 581, 595,
588, 529, 542, 578, 582; 238/14; 264/177 R,
210.1; 72/256, 253 R

[56] References Cited

U.S. PATENT DOCUMENTS

| 1,706,924 | 3/1929 | Kane | 52/529 |
|---|---|---|---|
| 2,091,157 | 8/1937 | Moorman | 94/5 |
| 2,742,121 | 4/1956 | Liskey, Jr. | 189/83 |
| 3,043,407 | 7/1962 | Marryatt | 189/34 |
| 3,046,852 | 7/1962 | Graham | 94/30 |
| 3,172,343 | 3/1965 | Jacobs | 94/5 |
| 3,180,460 | 4/1965 | Liskey, Jr. | 52/177 |
| 3,196,763 | 7/1965 | Rushton | 52/177 |
| 3,555,762 | 1/1971 | Costanzo, Jr. | 52/588 |

FOREIGN PATENT DOCUMENTS

| 834138 | 5/1960 | United Kingdom . |
|---|---|---|
| D912722 | 8/1963 | United Kingdom . |
| 1072924 | 6/1967 | United Kingdom . |

Primary Examiner—Paul J. Thibodeau
Attorney, Agent, or Firm—Richard J. Myers

[57] ABSTRACT

An extruded treadway includes a plurality of interlocking panels having upper surfaces which include nonskid members of pyramidal shape disposed in rectilinear configuration.

16 Claims, 8 Drawing Figures

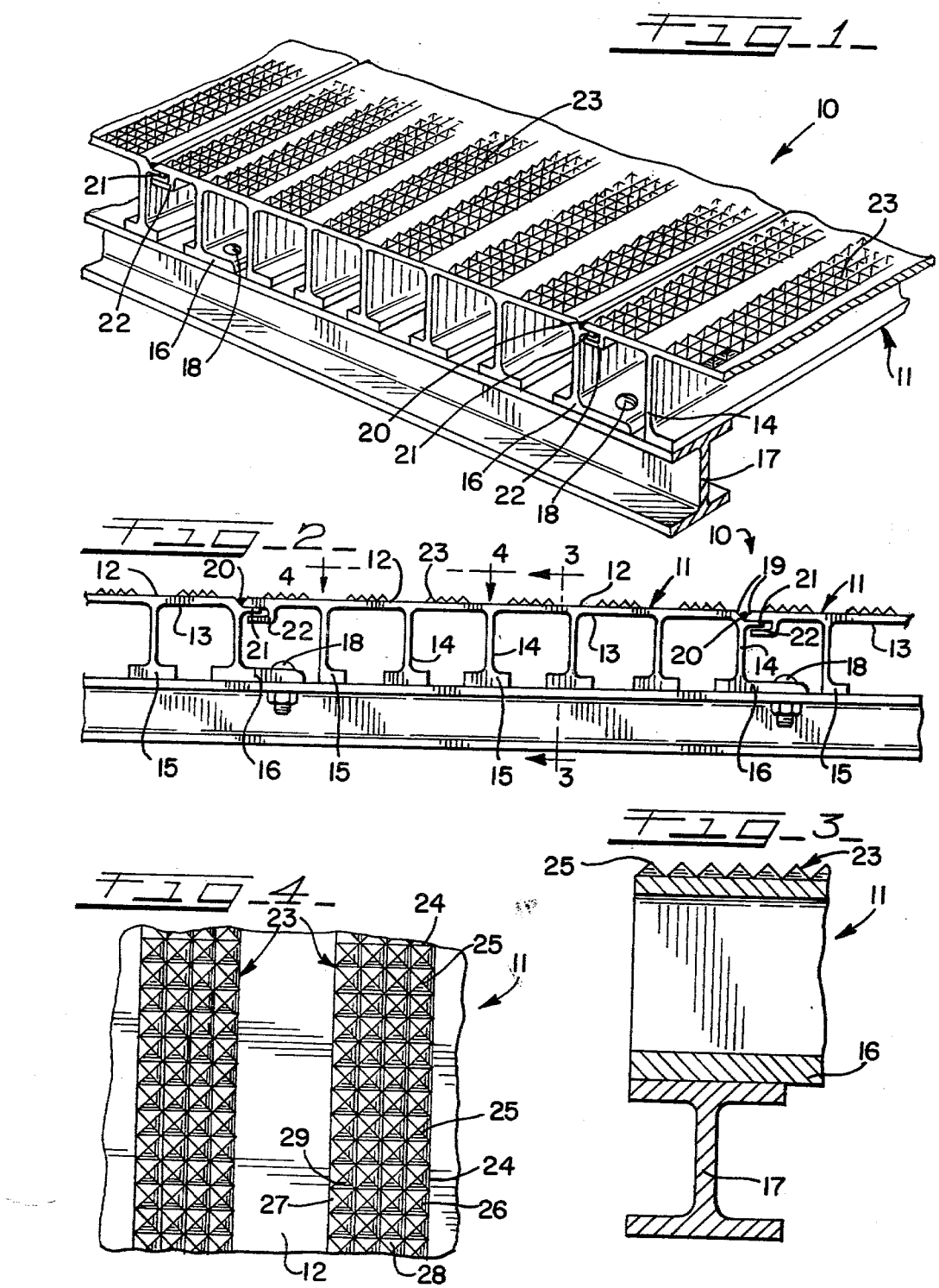

EXTRUDED NONSKID TREADWAY

BACKGROUND OF THE INVENTION

1. Field of the Invention

The present invention relates to treadways of nonskid design and more specifically includes a floor consisting of interlocking panels having nonskid pyramidal members.

2. Description of the Prior Art

The prior art includes floors comprising panel treadways having nonskid surface protrusions. Also, many of these are made by the use of aluminum extrusions with raised floor or panel surfaces which included ridges, projections, serration, rubber members and other shaped elements designed to eliminate skid hazards. Triangular projections as well as truncated projections with concave surfaces have been utilized. The present invention is an improvement over the prior art in that the treadway which is of extruded aluminum panels includes pyramidal projections which are formed at their vertices with sharp points, and are contiguously positioned in rectilinear and criss-cross relation thereby providing an improved nonskid construction.

SUMMARY OF THE INVENTION

The present invention comprises a treadway of nonskid design which is ideally suited for flooring and particularly floors of vehicles. Such vehicles may be trailers, containers, or other freight carrying equipment.

The treadway comprises a plurality of panels which preferably are of light weight metal such as aluminum. The panels are made by an extrusion process which provides a treadway surface supported on supporting members thereby raising said surface on the means which supports the treadways. The said means may be horizontal trailer floor beams or the like. The panels are provided with adjacent interlocking tongue and groove connections and are connected to the trailer floor beams. During the extruding process the raised surface is in turn provided with one or more flat projecting surfaces which are then subjected to a machining operation providing cross-forming. This is achieved by cutting grooves in one direction and then cutting the grooves in a perpendicular opposite direction. The grooves so formed provide contiguous pyramidal members or projections which each include a substantially four sided or rectangular base for each projection, pyramidal sides and a pointed vertex. The cross forming thus provides lateral and longitudinal rows of projections in contiguous and rectilinear relation.

A modified floor or treadway includes extruded panels which have a flat plate-like base supported on the trailer floor beams and connected thereto. T-shaped longitudinally extending and parallel extrusions are integral with the plate-like base, are laterally spaced with respect to one another, and are provided at their upper surfaces with the aforementioned pyramidal projection. These are cross formed in rail shaped flat upper surfaces projecting laterally outwardly on opposite sides of relatively narrow upstanding beams laterally spaced and thus defining the T-shaped, in cross section, configuration.

Another modified structure includes a floor of interconnected panels supported on the floor beams of the trailer.

In this construction the panels are of a serpentine, or corrugated type of configuration, which provides an upper surface consisting of horizontally spaced, parallel and linearly extending individual strip like surfaces, each of which is provided by strip treadways having the cross formed pyramidal projections.

BRIEF DESCRIPTION OF THE DRAWINGS

FIG. 1 is a perspective view of a treadway or floor portion of the present invention;

FIG. 2 is a side elevational view of the treadway of FIG. 1;

FIG. 3 is a cross-sectional view taken along the line of 3—3 of FIG. 2;

FIG. 4 is a fragmentary plan view taken along the line 4—4 of FIG. 2;

DESCRIPTION OF THE PREFERRED EMBODIMENT

Figure 5:
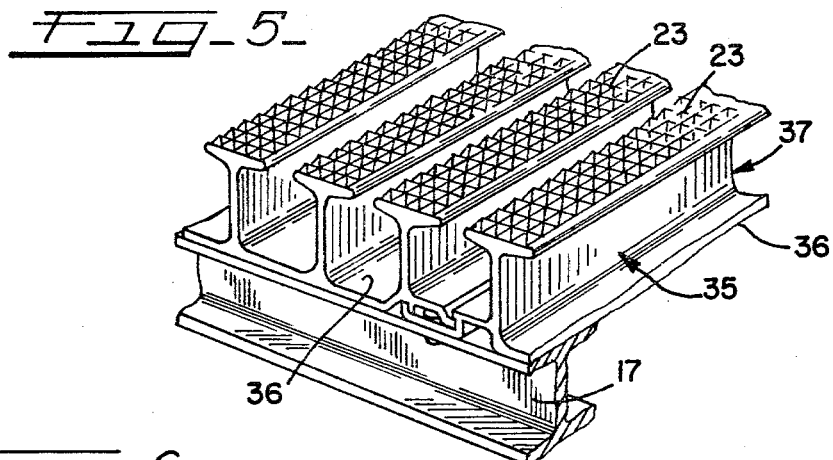
FIG. 5 is a fragmentary perspective view of a modified treadway.

A treadway, which may be the floor of a trailer, is designated as 10 and includes a plurality of interconnected sections 11. Each of the sections 11 includes an upper treadway surface 12, on a horizontally extending upper or top panel wall or portion 13. The walls 13 of the panels are carried in raised position by means of vertical support walls or portions 14, having enlarged lower feet or base portions 15 and connector flanges 16 provided at one side of each panel. The connector flanges 16 are secured to longitudinal floor beams 17 by rivets 18, the latter beams being of I-Beam construction.

The upper walls 13 of each panel 11 are provided with interlocking means in the form of tapered or truncated edges 19 which provide for contiguous V-shaped cavities extending longitudinally and which are filled by welds 20. One end of each panel includes a tongue 21 which is in tongue-and-groove connection with a grooved flange 22 of the other adjacent panel, thereby assuring proper positioning and interlocking of the panels.

Each panel includes upwardly projecting pointed members 23 of pyramidal shape. Each member 23 includes a base portion 24 of rectangular or four sided shape with sides projecting pyramidally upwardly and defining a pointed end 25 at the upper end or at the vertex of the same. The four sides may be designated, as shown in FIG. 4, as 26, 27, 28 and 29. This pyramidal shape with the pointed vertices 25 provides for an effective and clearly nonskid proof surface.

In the manufacture of this floor or treadway, the panels are extruded out of aluminum or other similar light metal. The pyramidal projections are not extruded, but the upper surface includes one or more upstanding rectangular surface projections which are then cross-formed by machining. A machine cutting operation, by angularly cutting or grooving in criss-cross relation, provides for the formation of the pyramidal shapes with the pointed vertices. Various cutting tools or grinding means can be employed for the cross forming operation. The cross forming thus provides for the criss-cross rectilinear disposition of the nonskid projections.

Figure 6:
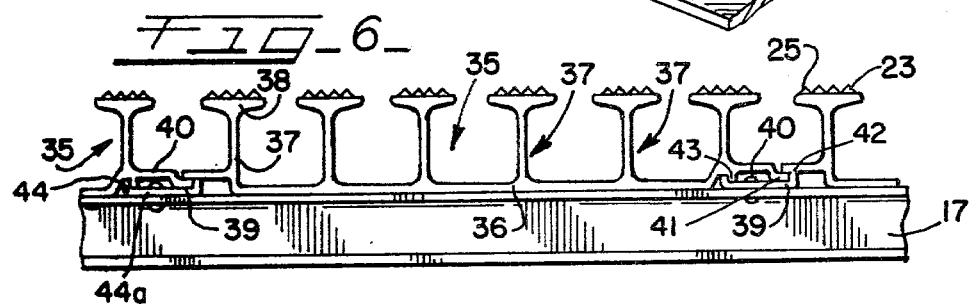
FIG. 6 is a cross sectional view of the treadway shown in FIG. 5.

FIGS. 5 through 8 disclose modified panels 35 of different configuration. In these, the pyramidal members 23 are formed or manufactured as above described and each includes the four sides 26, 27, 28 and 29 with the vertex 25. FIGS. 5 and 6 disclose the panels 35, each of which includes an extruded base or plate 36 having vertically extending extruded support rails or webs 37 which are provided at their upper ends with strip like tread members 38, which with the webs 37 form a T-shaped configuration. The panels 35 are provided on opposite sides with interlocking elements 39 and 40 which expedite the installation of the same and which then are secured to the trailer beams 17 by conventional fastening means.

A tongue and groove 41, 42, arrangement is provided on the bases of adjacent panels and a dependent rib projection or vertical flange 43 of interlocking element 40 interlocks with an upstanding rib or flange 44 on an extension or horizontal flange 44a of the interlocking element 39 of the base 36.

Figure 7:
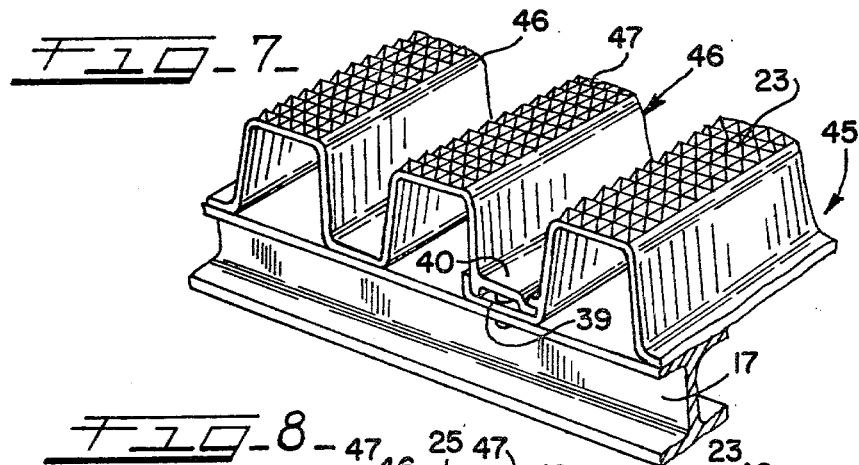
FIG. 7 is a fragmentary perspective view of another modified treadway.
Figure 8:
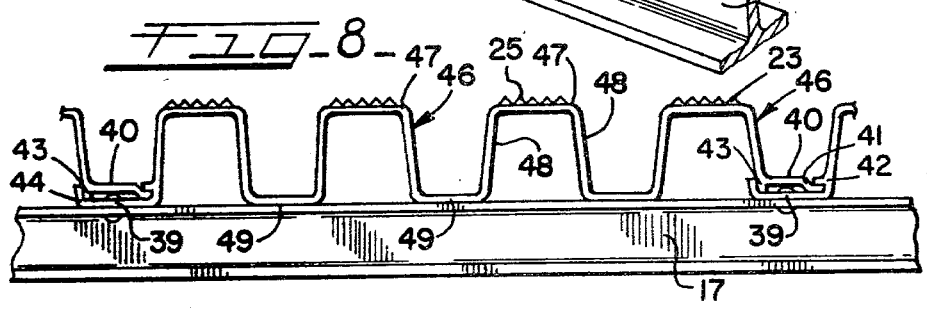
FIG. 8 is a cross sectional view of the treadway of FIG. 7.

FIGS. 7 and 8 disclose panels 45 of extruded corrugated type shape. These panels also can be described as comprising a plurality of spaced hat sections interconnected at their bottom edges by horizontal base portions. The hat sections 46 include upper laterally spaced strip treadways 47 which contain the pyramidal projections 23.

The hat sections 46 include upright walls 48 connected by base portions 49 seated upon the beams 17. The panels 45, like panels 35 include the interlocking edges or sides 39 and 40 which are connected to the beams 17 by conventional fasteners. The particular treadway shapes disclosed in the invention may be preferred by the individual manufacturer for a variety of reasons, and all include the unique pyramidal shapes formed by cross forming of the treadway surfaces.

Thus, it is clearly apparent that effective nonskid treadway panels have been achieved with an improved process of manufacturing the same.

What is claimed is:

1. A treadway comprising a plurality of extruded panels supported on support means, each panel including an upper support surface, said panel comprising:
   a plurality of upper horizontal and laterally spaced tread strips, said strips forming the entire upper surface of the panel,
   vertically extending horizontally spaced support members connected to said tread strip for individual supporting of each said tread strip in a raised position relative to and standing upon said associated support means,
   interlocking means on each panel adapted to interlock ends of said panels and adjoining said support means,
   a plurality of nonskid members integrally formed in each of said tread strips, and
   said nonskid members extending in contiguous and rectilinear relation.
2. The treadway in accordance with claim 1, said extruded panel being of metallic construction.
3. The treadway in acordance with claim 1, said nonskid members extending in rows longitudinally and laterally.
4. The treadway in accordance with claim 1, and said interlocking means covering fastener means attaching said extruded panels to said support means.
5. The invention in accordance with claim 2, said interlocking means including a grooved portion on one panel, and
   a tongue means on the other panel in engagement with said grooved portion.
6. The treadway in accordance with claim 1, and said support members forming a plurality of parallel vertical flanges resting on a flat plate supported by said support means.
7. The treadway in accordance with claim 1,
   said interlocking means including a horizontal flange and depending therefrom vertical flange on one panel,
   an angle portion on the other panel having its vertical flange in engagement with the other panel's vertical flange.
8. The treadway in accordance with claim 1,
   each of said nonskid members having a rectangular base portion and an upwardly extending pyramid like body terminating at a pointed vertex.
9. The treadway in accordance with claim 1,
   said horizontal strips and spaced support members having a T-shaped configuration.
10. The treadway in accordance with claim 1,
    wherein said nonskid members extend in relatively laterally spaced parallel rows.
11. The treadway in accordance with claim 1,
    said vertically extending horizontally spaced support members having a U-shaped configuration and said tread strips comprising horizontal laterally spaced upper strip being on said support members.
12. The treadway in accordance with claim 11,
    said U-shaped support members including lower interconnecting base portions supported on said support means.
13. A method of forming nonskid treadways which comprises the steps of
    extruding a panel into a shape which includes relatively flat horizontal tread strip portions, and a plurality of vertical support members adapted to individually support each of said horizontal tread strip portions in raised position relative to support means, and
    cross forming said projections by machining means which includes the steps of grooving said projecting strip portions in criss-cross relation to provide a plurality of rectilinearly disposed nonskid projections of pyramidal shape.
14. A treadway comprising a plurality of side by side positioned panel sections, each section comprising at least one panel having a horizontal top floor portion which comprises a tread strip, an upright support portion and a base portion,
    and means for interlocking said base portions to each other comprising means providing a generally horizontal groove in a lateral edge of one of the base portions of a panel of a first section and a generally horizontal tongue in a corresponding base portion of a contiguous panel of a second section extending into said groove,
    and supplementary means on the base portion of each section securing to each other the base portions of contiguous panels of the first and second sections.
15. The treadway in accordance with claim 14, and said supplementary means comprising upright interlocking elements in laterally abutting relation to each other disposed in opposition to separation of said tongue and groove interlocking means.

16. The treadway in accordance with claim 14, said supplementary means including an extension on the base portion of the panel of the second section underlapping said base portion of said panel of said first section and having an upwardly extending rib and a dependent projection of said upright portion of said first section in locking engagement with said rib for preventing separation of the tongue and groove in a lateral direction.

* * * * *